United States Patent [19]

Akagiri

[11] Patent Number: 5,621,856
[45] Date of Patent: Apr. 15, 1997

[54] DIGITAL ENCODER WITH DYNAMIC QUANTIZATION BIT ALLOCATION

[75] Inventor: Kenzo Akagiri, Kanagawa, Japan

[73] Assignee: Sony Corporation, Japan

[21] Appl. No.: 465,340

[22] Filed: Jun. 5, 1995

Related U.S. Application Data

[62] Division of Ser. No. 272,872, Jul. 8, 1994, which is a continuation of Ser. No. 924,298, Aug. 3, 1992, abandoned.

[30] Foreign Application Priority Data

Aug. 2, 1991 [JP] Japan .................................. 3-216216
Aug. 2, 1991 [JP] Japan .................................. 3-216217
Aug. 27, 1991 [JP] Japan .................................. 3-271774

[51] Int. Cl.⁶ .............................. G10L 3/02; G10L 9/00
[52] U.S. Cl. ...................... 395/2.38; 395/2.39; 395/2.35
[58] Field of Search ................................ 395/2.38, 2.39, 395/2.35, 2.12–2.15; 381/29–51

[56] References Cited

U.S. PATENT DOCUMENTS

| | | | |
|---|---|---|---|
| 4,184,049 | 1/1980 | Crochiere et al. | 381/31 |
| 4,455,649 | 6/1984 | Esteban et al. | 381/31 X |
| 4,535,472 | 8/1985 | Tomcik | 381/31 |

(List continued on next page.)

FOREIGN PATENT DOCUMENTS

| | | | |
|---|---|---|---|
| 0145788A1 | 6/1985 | European Pat. Off. | H04B 12/02 |
| 0409248A2 | 1/1991 | European Pat. Off. | H03M 7/30 |
| 0420745A2 | 4/1991 | European Pat. Off. | H04B 1/66 |

OTHER PUBLICATIONS

Y. Mahieux & J.P. Petit, "Transform Coding of Audio Signals at 64 kbit/s," Globecom 90, vol. 1, pp. 518–522 (Dec. 1990)*.

G. Thiele et al., "Low Bit–Rate Coding of High–Quality Audio Signals; an Introduction to the MASCAM system EBU Review, Technical", No. 230, pp. 158–181 (Aug. 1988)*.

Brandenburg et al., "Aspec: Adaptive Spectral Entropy Coding of High Quality Music Signals," Audio Engineering Society Preprint No. 3011 (1991 Feb.)*.

Davidson et al., "Low Complexity Tranform Coder for Satellite Link Applications," Audio Engineering Society Preprint No. 2966 (1990 Sep.)*.

(List continued on next page.)

*Primary Examiner*—Allen R. MacDonald
*Assistant Examiner*—Patrick N. Edouard
*Attorney, Agent, or Firm*—Limbach & Limbach L.L.P.

[57] ABSTRACT

A digital encoder for compressing a digital input signal derived from an analog signal to reduce the number of bits required to represent the analog signal with low quantizing noise. In the encoder, a digital input signal representing the analog signal is divided into three frequency ranges. The digital signal in each of the three frequency ranges is divided in time into frames, and subdivided into blocks, the time duration of which may be adaptively varied. The blocks are orthogonally transformed into spectral coefficients, which are grouped into critical bands. The total number of bits available for quantizing the spectral coefficients is allocated among the critical bands. In a first embodiment and a second embodiment, fixed bits are allocated among the critical bands according to a selected one of a plurality of predetermined bit allocation patterns and variable bits are allocated among the critical bands according to the energy in the critical bands. In the first embodiment, the apportionment between fixed bits and variable bits is fixed. In a second embodiment, the apportionment between fixed bits and variable bits is varied according to the smoothness of the spectrum of the input signal. In a third embodiment, bits are allocated among the critical bands according to a noise shaping factor that is varied according to the smoothness of the spectrum of the input signal. All three embodiments give low quantizing noise with both broad spectrum signals and highly tonal signals.

13 Claims, 11 Drawing Sheets

U.S. PATENT DOCUMENTS

| | | | |
|---|---|---|---|
| 4,896,362 | 1/1990 | Veldhuis et al. | 381/41 |
| 4,932,062 | 6/1990 | Hamilton | 381/46 |
| 4,949,383 | 8/1990 | Koh et al. | 381/31 |
| 4,956,871 | 9/1990 | Swaminathan | 381/31 |
| 4,964,166 | 10/1990 | Wilson | 381/34 |
| 4,972,484 | 11/1990 | Thiele et al. | 381/87 |
| 5,042,069 | 8/1991 | Chhatwal et al. | 381/31 |
| 5,049,992 | 9/1991 | Citta et al. | 358/140 |
| 5,105,463 | 4/1992 | Veldhuis et al. | 381/30 |
| 5,109,417 | 4/1992 | Fielder et al. | 381/36 |
| 5,115,240 | 5/1992 | Fujiwara et al. | 341/51 |
| 5,117,228 | 5/1992 | Fuchigami et al. | 341/51 |
| 5,125,030 | 6/1992 | Nomura et al. | 381/31 |
| 5,134,475 | 7/1992 | Johnston et al. | 375/133 |
| 5,142,656 | 8/1992 | Fielder et al. | 381/37 |
| 5,151,941 | 9/1992 | Nishiguchi et al. | 381/46 |
| 5,157,760 | 10/1992 | Akagiri | 395/2 |
| 5,166,686 | 11/1992 | Sugiyama | 341/155 |
| 5,222,189 | 6/1993 | Fielder | 395/2 |
| 5,235,671 | 8/1993 | Mazor | 395/2 |
| 5,264,846 | 11/1993 | Oikawa | 341/76 |
| 5,268,685 | 12/1993 | Fujiwara | 341/76 |

OTHER PUBLICATIONS

Esteban et al., "Application of Quadrature Mirror Filters to Split Band Voice Coding Schemes," Record of the 1977 ICASSP, pp. 191–195 (1977 May)*.

Johnston, "Transform Coding of Audio Signals Using Perceptual Noise Criteria," 6 IEEE Trans. on Selected Areas in Communications, 314–323 (1988 Feb.)*.

Rothweiler, "Polyphase Quadrature Filters–A New Subband Coding Technique," 3 Proc. 1983 ICASSP 1280–1283 (1983 Apr.)*.

Schroeder et al., "High Quality Digital Audio Encoding with 3.0 Bits/Sample Using Adaptive Transform Coding," Audio Engineering Society Preprint No. 2321 (1986 Mar.)*.

Stoll et al, "Masking–Pattern Adapted Sub–Band Coding: Use of the Dynamic Bit–Rate Margin," Audio Engineering Society Preprint No. 2585 (1988 Mar.)*.

DIGITAL ENCODER WITH DYNAMIC QUANTIZATION BIT ALLOCATION

This is a divisional of application Ser. No. 08/272,872, filed Jul. 8, 1994; which is a continuation of Ser. No. 07/924,298, filed Aug. 3, 1992, now abandoned.

FIELD OF THE INVENTION

The invention relates to a digital encoder circuit for compressing a digital input signal to reduce the number of bits required to represent an analog information signal.

BACKGROUND OF THE INVENTION

A variety of techniques exist for digitally encoding audio or speech signals using bit rates considerably lower than those required for pulse-code modulation (PCM). In sub-band coding (SBC), a filter bank divides the frequency band of the audio signal into a plurality of sub bands. In sub-band coding, the signal is not formed into frames along the time axis prior to coding. In transform encoding, a frame of digital signals representing the audio signal on the time axis is converted by an orthogonal transform into a block of spectral coefficients representing the audio signal on the frequency axis.

In a combination of sub-band coding and transform coding, digital signals representing the audio signal are divided into a plurality of frequency ranges by sub-band coding, and transform coding is independently applied to each of the frequency ranges.

Known filters for dividing a frequency spectrum into a plurality of frequency ranges include the Quadrature Mirror Filter (QMF), as discussed in, for example, R. E. Crochiere, *Digital Coding of Speech in Subbands*, 55 BELL SYST. TECH. J., No. 8, (1976). The technique of dividing a frequency spectrum into equal-width frequency ranges is discussed in Joseph H. Rothweiler, *Polyphase Quadrature Filters—A New Subband Coding Technique*, ICASSP 83 BOSTON.

Known techniques for orthogonal transform include the technique of dividing the digital input audio signal into frames of a predetermined time duration, and processing the resulting frames using a Fast Fourier Transform (FFT), discrete cosine transform (DCT) or modified DCT (MDCT) to convert the signals from the time axis to the frequency axis. Discussion of a MDCT may be found in J. P. Princen and A. B. Bradley, *Subband/Transform Coding Using Filter Bank Based on Time Domain Aliasing Cancellation*, ICASSP 1987.

In a technique of quantizing the spectral coefficients resulting from an orthogonal transform, it is known to use sub bands that take advantage of the psychoacoustic characteristics of the human auditory system. In this, spectral coefficients representing an audio signal on the frequency axis may be divided into a plurality of critical frequency bands. The width of the critical bands increase with increasing frequency. Normally, about 25 critical bands are used to cover the audio frequency spectrum of 0 Hz to 20 kHz. In such a quantizing system, bits are adaptively allocated among the various critical bands. For example, when applying adaptive bit allocation to the spectral coefficient data resulting from a MDCT, the spectral coefficient data generated by the MDCT within each of the critical bands is quantized using an adaptively-allocated number of bits.

Known adaptive bit allocation techniques include that described in IEEE TRANs. ON ACOUSTICS, SPEECH, AND SIGNAL PROCESSING, VOL. ASSP-25, No. 4 (August, 1977) in which bit allocation is carried out on the basis of the amplitude of the signal in each critical band. This technique produces a flat quantization noise spectrum and minimizes noise energy, but the noise level perceived by the listener is not optimum because the technique does not effectively exploit the psychoacoustic masking effect.

In the bit allocation technique described in M. A. Krassner, *The Critical Band Encoder—Digital Encoding of the Perceptual Requirements of the Auditory System*, ICASSP 1980, the psychoacoustic masking mechanism is used to determine a fixed bit allocation that produces the necessary signal-to-noise ratio for each critical band. However, if the signal-to-noise ratio of such a system is measured using a strongly tonal signal, for example, a 1 kHz sine wave, non-optimum results are obtained because of the fixed allocation of bits among the critical bands.

It is also known that, to optimize the perceived noise level using the amplitude-based bit allocation technique discussed above, the spectrum of the quantizing noise can be adapted to the human auditory sense by using a fixed noise shaping factor. Bit allocation is carried out in accordance with the following formula:

$$b(k) = \delta + \tfrac{1}{2}\log_2\{\sigma^{2(1+\gamma)}(k)/D\} \qquad (1)$$

where $b(k)$ is the word length of the quantized spectral coefficients in the k'th critical band, $\delta$ is an optimum bias, $\sigma^2(k)$ is the signal power in the k'th critical band, D is the mean quantization error power over all the entire frequency spectrum, and $\gamma$ is the noise shaping factor. To find the optimum value of $b(k)$ for each critical band, the value of $\delta$ is changed so that the sum of the $b(k)$s for all the critical bands is equal to, or just less than, the total number of bits available for quantization.

This technique does not allow bits to be concentrated sufficiently within a single critical band, so unsatisfactory results are obtained when the signal-to-noise ratio is measured using a high tonality signal, such as a 1 kHz sine wave.

OBJECTS AND SUMMARY OF THE INVENTION

It can be seen from the foregoing that, if quantization noise is minimized by allocating bits among the critical bands according to the amplitude of the signal in each respective critical band, the quantization noise perceived by the listener is not minimized. It can also be seen that if fixed numbers of bits are allocated among the critical bands, taking into account psychoacoustic masking, the signal-to-noise ratio is unsatisfactory when measured using a high-tonality signal, such as a 1 kHz sine wave.

Accordingly, it is an object of the present invention to provide a circuit in which bits are allocated among the critical bands such that the quantization noise perceived by a human listener is minimized, and that a satisfactory signal-to-noise ratio can be measured using a high-tonality input signal, such as a 1 kHz sine wave.

According to a first aspect of the invention, a digital encoding apparatus for compressing a digital input signal to provide a compressed digital output signal is provided. The apparatus includes a first frequency dividing device that receives the digital input signal and divides the digital input signal into a plurality of frequency ranges. A time dividing device divides at least one of the frequency ranges of the digital input signal in time. The result of this time division is a plurality of frames. A second frequency dividing device orthogonally transforms each frame to provide a plurality of spectral coefficients. A device groups the plurality of spectral coefficients into critical bands. A bit allocating device allocates the total number of quantizing bits available for quantizing the spectral coefficients among the critical bands. The total number of bits includes fixed bits, which are allocated among the critical bands according to a selected one of a plurality predetermined bit allocation patterns. The total number of bits also includes variable bits, which are allocated among the critical bands according to signal energy in the critical bands. Finally, the apparatus includes a device that allocates the variable bits among the critical bands in response to signal energy in a data block derived by dividing the digital input signal in time and in frequency.

In a first variation, number of fixed bits is constant, and the number of variable bits is constant.

In a second variation, the bit allocation device includes a device for apportioning the total number of quantizing bits available for quantizing the spectral coefficients between fixed bits and variable bits. The apportionment is made in response to the smoothness of the spectrum of the digital input signal.

In a second embodiment of the invention, a digital encoding apparatus for compressing a digital input signal to provide a compressed digital output signal is provided. The digital input signal represents an audio information signal, and the compressed digital output signal, after expansion, conversion to an analog signal, and reproduction of the analog signal, is for perception by the human ear. The second embodiment of the apparatus comprises a first frequency dividing device that receives the digital input signal and divides the digital input signal into a plurality of frequency ranges. A time dividing device divides in time at least one of the frequency ranges of the digital input signal. The result of the time division is a plurality of frames. A second frequency dividing device orthogonally transforms each frame to provide a plurality of spectral coefficients. A device groups the plurality of spectral coefficients into critical bands. A noise factor setting device sets a noise shaping factor in response to the digital input signal. Finally, a bit allocating device allocates the total number of quantizing bits available for quantizing the spectral coefficients among the critical bands. The quantizing bits are allocated among the critical bands according to the noise-shaping factor.

In a first method according to the invention for deriving compressed digital data from a non-compressed digital input signal, the non-compressed digital input signal is divided into a plurality of frequency ranges. Each of the frequency ranges of the non-compressed digital input signal is divided in time into a plurality of frames. Each frame is orthogonally transformed to provide a plurality of spectral coefficients. The plurality of spectral coefficients is grouped into critical bands. The total number of quantizing bits available for quantizing the spectral coefficients is allocated among the critical bands. The total number of bits includes fixed bits that are allocated among the critical bands according to a selected one of a plurality predetermined bit allocation patterns. The total number of bits also includes variable bits that are allocated among the critical bands according to signal energy in the critical bands. Finally, the quantized spectral coefficients and quantizing word length data are multiplexed to provide the compressed digital data.

In a second method according to the invention of deriving compressed digital data from a non-compressed digital input signal, the non-compressed digital input signal is divided into a plurality of frequency ranges. Each of the frequency ranges of the non-compressed digital input signal is divided in time into a plurality of frames. Each frame is orthogonally transformed to provide a plurality of spectral coefficients. The plurality of spectral coefficients is grouped into critical bands. A noise shaping factor is set in response to the non-compressed digital input signal. The total number of quantizing bits available for quantizing the spectral coefficients is allocated among the critical bands according to the noise-shaping factor. Finally, the quantized spectral coefficients and quantizing word length data are multiplexed to provide the compressed digital data.

The invention also encompasses a medium for recording compressed digital data derived from a non-compressed digital input signal according to either of the two methods set forth above.

Finally, the invention encompasses a decoding apparatus for expanding compressed digital data derived from a non-compressed digital input signal according to either of the methods set forth above. The decoding apparatus according to the invention comprises a demultiplexer that extracts the quantizing word length data from the compressed digital data and extracts the spectral coefficients from the compressed digital input signal using the quantizing word length data. A device groups the extracted spectral coefficients into a plurality of frequency ranges. A device performs an inverse orthogonal transform on the spectral coefficients in each frequency range to generate frames of time-dependent data in each frequency range. Finally, a device combines the frames of time-dependent data in each frequency range to provide the digital output signal.

DETAILED DESCRIPTION OF THE INVENTION

Figure 1:
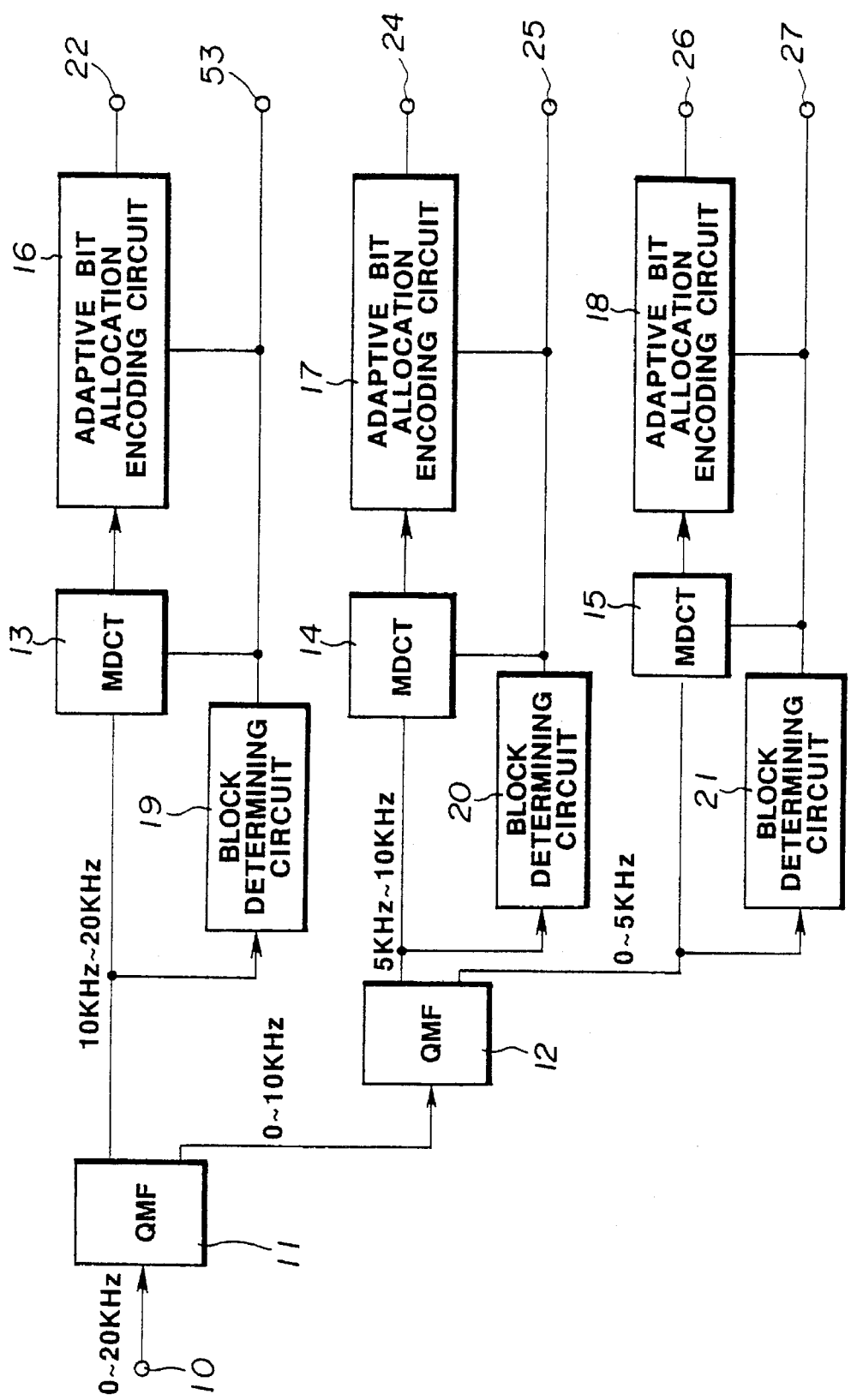
FIG. 1 is a block circuit diagram of an encoding apparatus according to the present invention.

Referring to FIG. 1, an embodiment will be described in which a digital input signal, such as a PCM audio signal, is compressed using the techniques of sub-band coding (SBC), adaptive transform coding (ATC), and adaptive bit allocation (APC-AB).

In the encoding apparatus shown in FIG. 1, a digital input signal is divided in frequency into a plurality of frequency ranges by a filter. Each signal in the plurality of frequency ranges is orthogonally transformed from the time axis to the frequency axis. The resulting spectral coefficients are then quantized using adaptive bit allocation. Quantizing bits are allocated to the spectral coefficients grouped in critical bands, which enables the psychoacoustic characteristics of the human hearing mechanism to be taken into account.

A critical band is a frequency band that takes advantage of the psychoacoustic characteristics of the human hearing mechanism. A critical band is the band of noise that can be masked by a pure sound that has the same intensity as the noise and has a frequency in the vicinity of the frequency of the noise. The width of the critical band increases with increasing frequency of the pure sound. The entire audio frequency range of 0 Hz to 20 kHz can be divided into, for example, 25 critical bands.

The following description will refer on occasions to the quantization noise of the compressed digital signal produced by the encoder that is the subject of this invention. The quantization noise of the compressed digital signal does not manifest itself until the compressed digital signal is converted back into an analog signal. However, reference will be made to the quantization noise of the compressed digital signal for brevity.

The digital input signal can be divided into a plurality of frequency ranges by means of a filter or the like, without division along the time axis. The frequency ranges may be of equal width.

In the present embodiment, the digital input signal is divided into frames along the time axis. The orthogonal transform is performed on blocks of data obtained by dividing each frame in time by a divisor of one or more. The divisor is changed in response to the input signal.

The present embodiment also includes floating point processing. Floating point processing is a normalization process that reduces the number of bits required to represent, for example, one frame of the signal along the time axis. This reduces the complexity of circuitry required. Floating point processing can be applied to each frame of the signal or to groups of frames. Additionally, floating point processing can be applied to the spectral coefficients resulting from the orthogonal transform. Floating point processing can be applied to each critical band, to a group of critical bands, or, in critical bands at higher frequencies, to a sub-band obtained by subdivision of the critical band in frequency.

Referring to FIG. 1, a PCM audio signal in the frequency range of 0 Hz to 20 kHz, for example, is supplied to the input terminal 10. The spectrum of the input signal is divided into frequency ranges by the band-dividing filter 11. Preferably, a quadrature mirror filter (QMF) is used to divide the spectrum of the input signal into a 0 Hz to 10 kHz frequency range and into a 10 to 20 kHz frequency range. The 0 Hz to 10 kHz frequency range is further divided by a second band-dividing filter 12, preferably also a QMF filter, into a 0 Hz to 5 kHz frequency range and a 5 to 10 kHz frequency range.

The signals in the 10 kHz to 20 kHz frequency range from the band-dividing filter 11 are connected to the orthogonal transform circuit 13. The signals in the 5 kHz to 10 kHz frequency range from the band-dividing filter 12 are connected to the orthogonal transform circuit 14. The signals in the 0 to 5 kHz frequency range from the band-dividing filter 12 are connected to the orthogonal transform circuit 15. The orthogonal transform circuits 13, 14, and 15 are preferably modified discrete cosine transform (MDCT) circuits, but the other types of orthogonal transform circuits mentioned above could alternatively be used.

Figure 2:
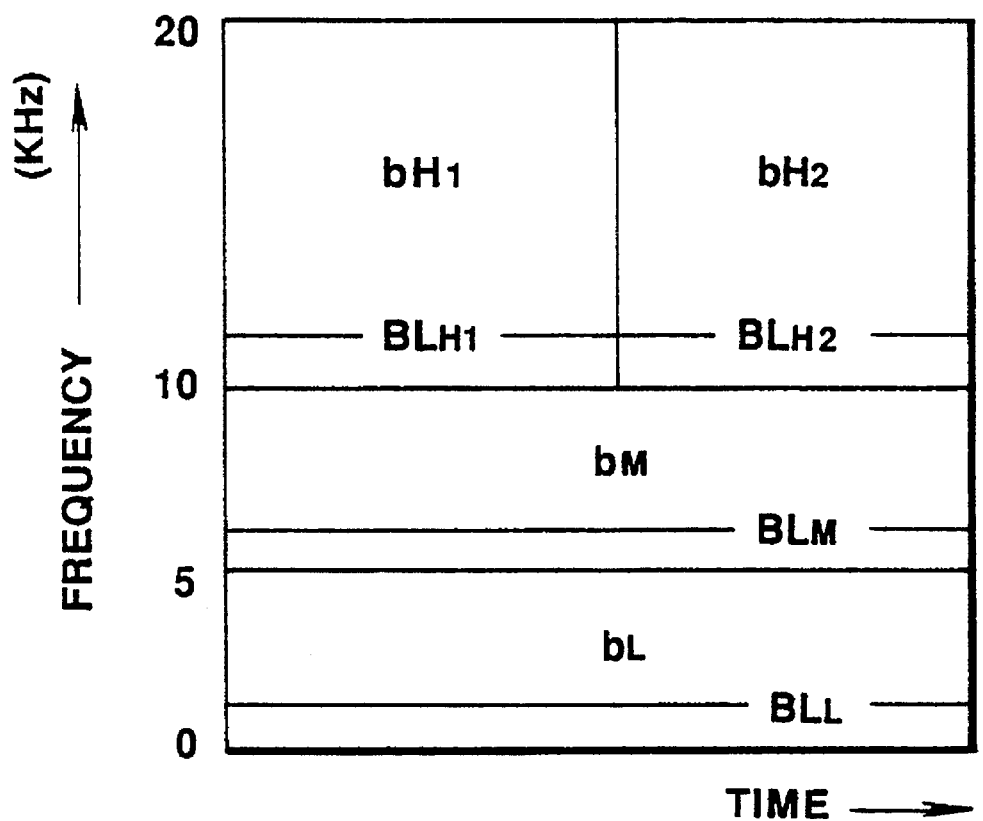
FIG. 2 shows a practical example of how the digital input signal is divided in frequency and time in the circuit shown in FIG. 1.

FIG. 2 shows a practical example of the block sizes of the frequency- and time-divided digital signals fed into the MDCT circuits 13, 14 and 15. In FIG. 2, the frequency ranges are wider and the time resolution is greater, that is, the block length is shorter, with increasing frequency. The number of samples $BL_L$ in each block $b_L$ in the lower frequency range of 0 Hz to 5 kHz is 256, for example. The number of samples $BL_M$ in each block $b_M$ in the middle frequency range of 5 to 10 kHz is also 256, for example. Thus, in the low and middle frequency ranges, the block length is equal to the frame length.

The number of samples $BL_H$ in each block $b_H$ in the higher frequency range of 10 to 20 kHz is $BL_L/2$ or $BL_M/2$, i.e., 128. This is one-half of the number of samples in the blocks $b_L$ and $b_M$ in the low and middle frequency ranges, respectively. The number of samples is one-half because the bandwidth of the upper frequency range is twice that of the middle and lower frequency ranges. This halves the spectral resolution in the high-frequency range, and therefore provides the same number of spectral coefficients in the high-frequency range as in each of the middle- and low-frequency ranges. Using shorter-length blocks in the high frequency range increases the temporal resolution in this range, in which the signal dynamics are most likely to change quickly.

Additionally, the respective frames may be further adaptively divided along the time axis by factors of 2 or 4 at times when the input signal changes quickly.

Returning to FIG. 1, the spectral coefficients produced by the MDCT circuits 13 to 15 are grouped into critical bands, or into sub bands obtained by frequency subdivision of the higher-frequency critical bands. The resulting data is fed into the adaptive bit allocation circuits 16 to 18.

In the adaptive bit allocation circuits 16 to 18, the spectral coefficients within each critical band are quantized using a number of quantizing bits allocated to each critical band, or to each sub band obtained by frequency subdivision of a higher-frequency critical band, using one of the bit allocation techniques to be described below. The resulting quantized data is fed to the output terminals 22, 24 and 26. Floating point data, indicating the manner of signal normalization, and quantization word length data, indicating the quantization word lengths are also provided as outputs. A multiplexing circuit (not shown) combines the quantized spectral coefficients, floating point data, and quantization word length data to provide a single compressed digital output signal. The compressed digital output can then be transmitted or recorded on a suitable recording medium for later reproduction and decoding. Examples of suitable recording media are magneto-optical discs, optical discs, and semiconductor memories.

Figure 3:
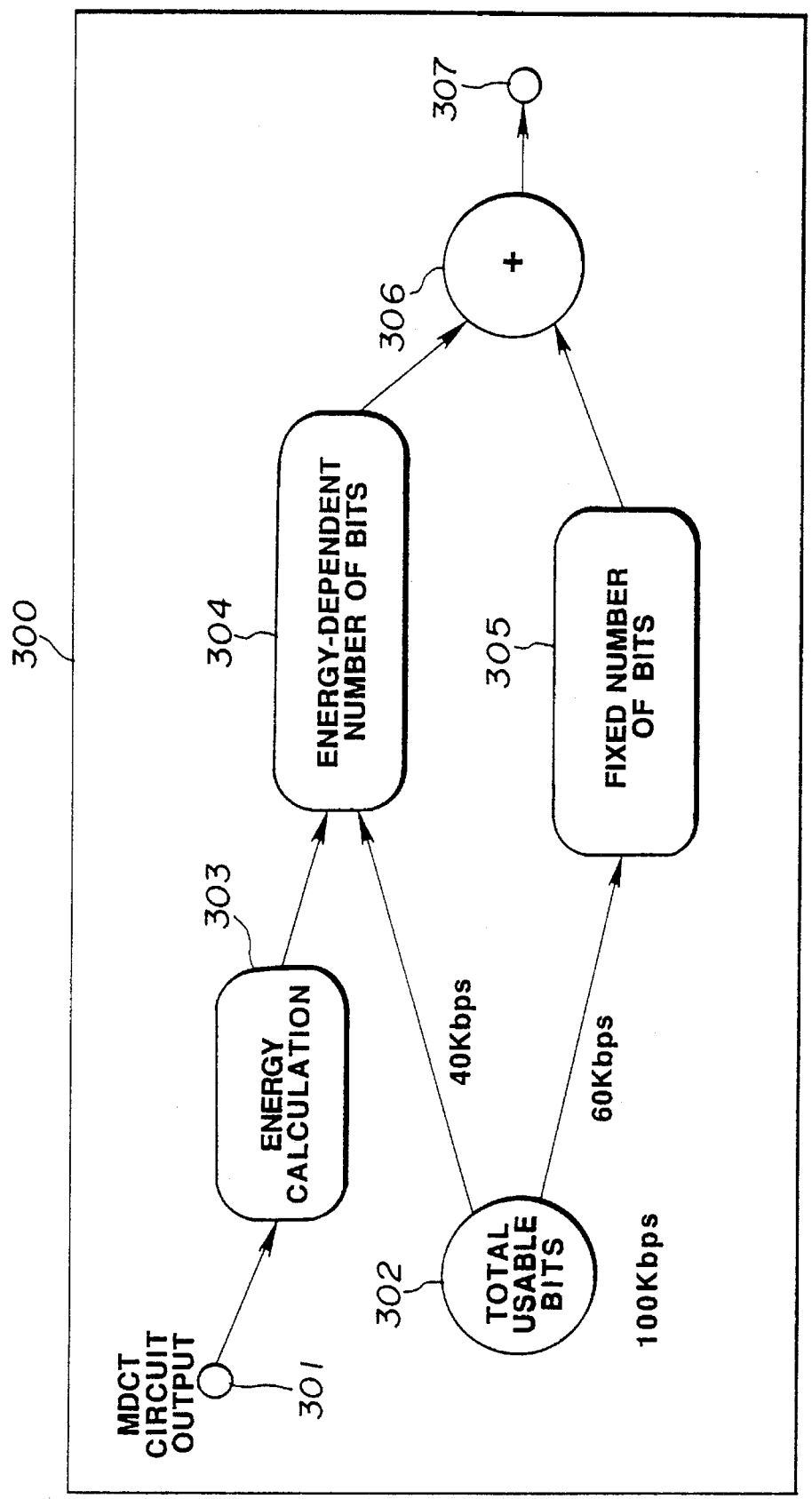
FIG. 3 is a block diagram illustrating the bit allocation circuit of the adaptive bit allocation and encoding circuit of FIG. 1. The bit allocation circuit has a fixed ratio between fixed bits and variable bits.

FIG. 3 is a functional block diagram showing a practical example for explaining the function of the adaptive bit allocation and encoding circuits 16 to 18. The spectral coefficients generated by the MDCT circuits 13 to 15 (FIG. 1) are supplied to the input terminal 301 of the adaptive bit allocation circuit 300, and thence to the energy calculating circuit 303.

The energy calculating circuit calculates the energy in each of the critical bands. The circuit determines the energy in each critical band by calculating the root mean square values of the spectral components in the band. The peak or mean values of the spectral components may alternatively be used to indicate the energy in each critical band.

Figure 4:
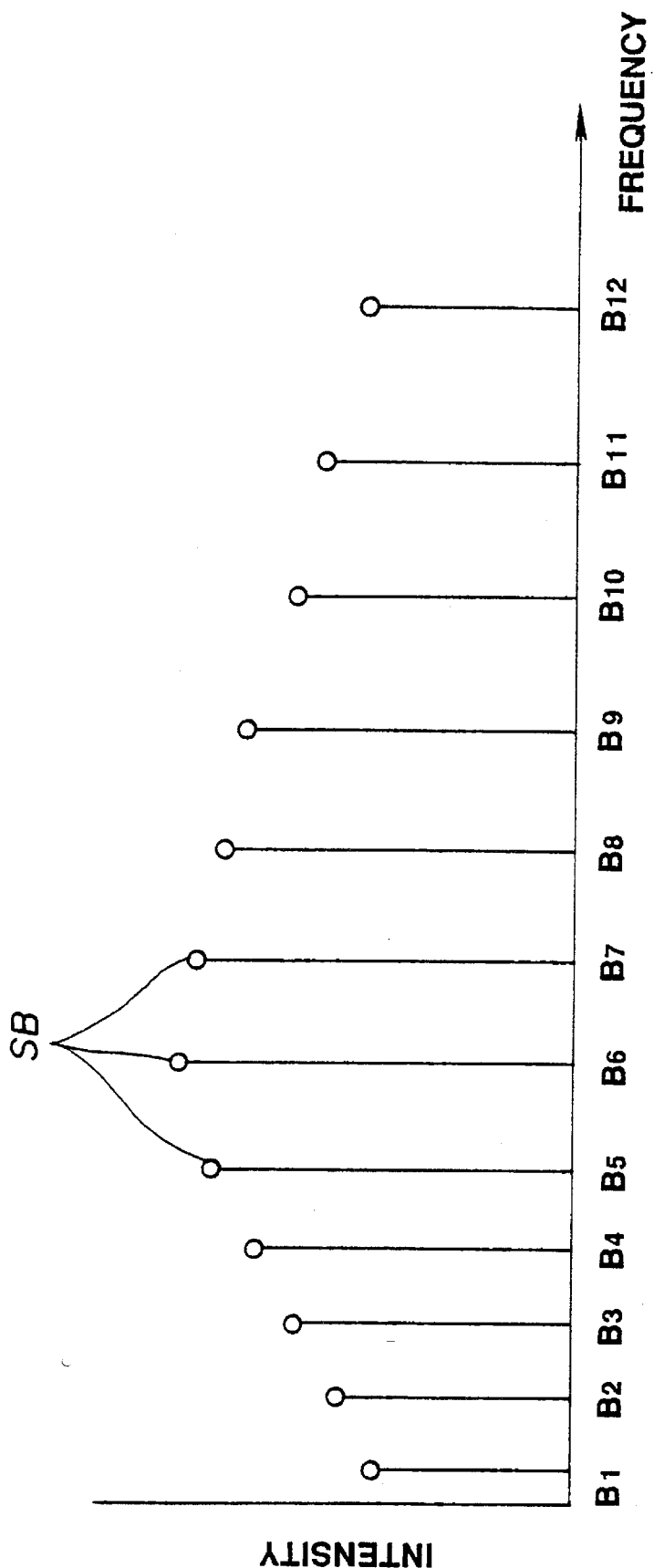
FIG. 4 shows a Burke spectrum.

FIG. 4 shows a plot of the energy in each of the critical bands, representing the output of the energy calculating circuit 303. For simplicity of illustration, FIG. 4 shows the energy in only twelve critical bands B1 to B12. In a practical circuit, a larger number of critical bands would be used. Additionally, some of the higher-frequency critical bands could be divided into sub bands. The energy in successive critical bands is referred to as a Burke spectrum.

The operation of the adaptive bit allocation circuit will now be described in more detail by referring to FIG. 3. It will now be assumed that the total number of bits which can be used to quantize the spectral coefficients, and which may be used for transmission or recording, is 100 kilobits per second (kb/s). This is indicated in FIG. 3 as the total number of bits from the block 302.

Of the total of 100 kb/s from the block 302, 60 kb/s are provided to the fixed bit allocating circuit 305 for allocation according to a selected one of a number of predetermined bit allocation patterns, and the remaining 40 kb/s are provided to the variable bit allocation circuit for allocation among the critical bands depending on the Burke spectrum.

A plurality of predetermined bit allocation patterns are provided for allocating among the critical bands the 60 kb/s allocated to the predetermined bit allocation patterns. One predetermined bit allocation pattern is selected at a time, according to signal properties, and bits are allocated among the critical bands according to the selected predetermined bit pattern.

In the present embodiment, the selected one of the predetermined bit allocation patterns allocates among the critical bands the 60 kb/s of bits that are available for allocation among the critical bands according to a preselected bit allocation pattern.

The bits for allocation according to the energy in the critical bands (40 kb/s) are fed from the total usable bit circuit 302 to the energy dependent bit allocation circuit 304, which also receives the output of the energy calculation circuit 303. The energy dependent bit allocation circuit allocates bits among the critical bands according to the energy in the critical bands. Bits are allocated among the critical bands according to the formula:

$$b(k) = \delta + \tfrac{1}{2}\log_2\{\sigma^2(k)/D\} \quad (2)$$

where $b(k)$ is the word length of the quantized spectral coefficients in the k'th critical band, $\delta$ is an optimum bias, $\delta^2(k)$ is the signal energy in the k'th critical band, and D is the mean quantization noise power over all the entire frequency spectrum. To find the optimum value of $b(k)$ for each critical band, the value of $\delta$ is changed so that the sum of the $b(k)$s for all the critical bands is equal to, or just less than, the total number of bits available for quantization.

Alternatively, the energy dependent bit allocation circuit allocates bits among the critical bands according to the energy in a data block derived by dividing the digital input signal in time and in frequency.

The present embodiment provides a plurality of predetermined bit allocation patterns having different bit allocation ratios for low- to mid-frequency critical bands and for high-frequency critical bands. A bit allocation pattern allocating fewer bits to the high-frequency critical bands is selected when the amplitude of the input signal is small. This takes advantage of the loudness effect in which the sensitivity of the ear to higher frequencies is reduced at low signal levels.

Although the amplitude of the full frequency-range digital input signal may be used to select the appropriate predetermined bit allocation pattern, it is also possible to use an output of one of the MDCT circuits or the output of a non-block forming frequency dividing circuit. A non-block forming frequency dividing circuit is a circuit that divides the frequency spectrum of a signal using, e.g., a filter that does not divide the signal into frames or blocks along the time axis.

The outputs of the fixed bit allocating circuit and the variable bit allocating circuit are fed into the bit sum calculating circuit 306. The bit sum calculating circuit calculates the total number of bits that can be used for each critical band. This sum comprises the number of bits allocated to the critical band according to the selected one of the predetermined bit allocation patterns, and the number of bits allocated to the critical band depending on the signal energy (or amplitude) in the critical band, or a sub band thereof for higher frequency critical bands. The bit sum calculated by the bit sum calculating circuit is fed via the output terminal 307 to be used for quantization.

Figure 5:
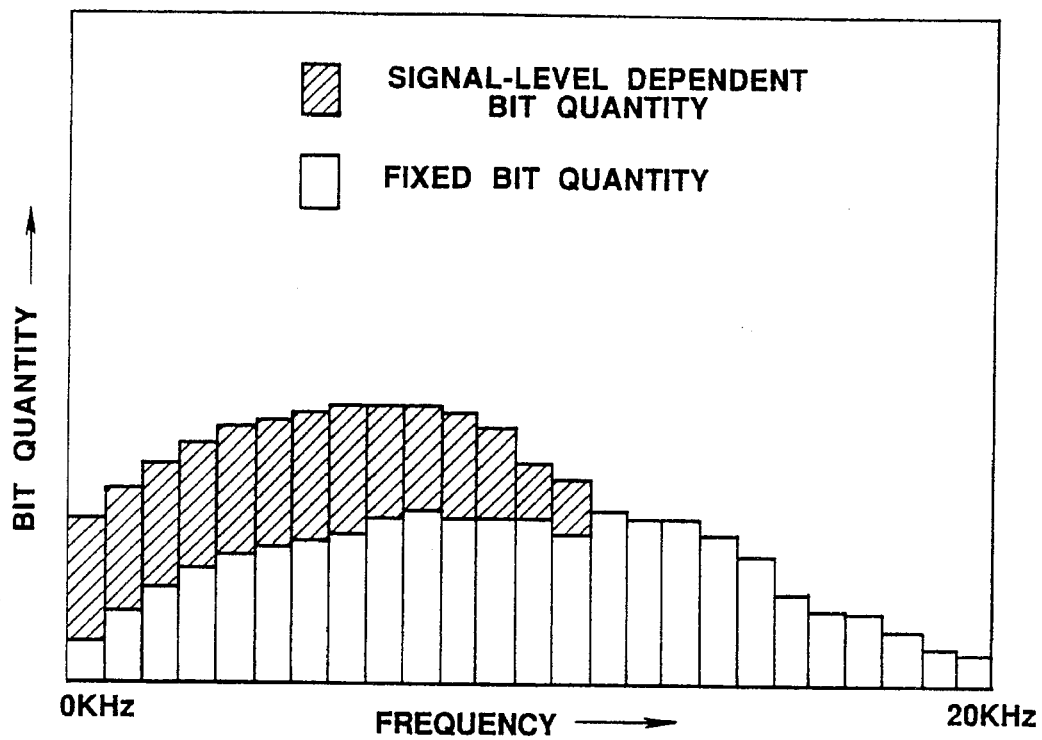
FIG. 5 is a graph showing an example of how the circuit shown in FIG. 1 allocates bits to a signal having a relatively flat spectrum.
Figure 6:
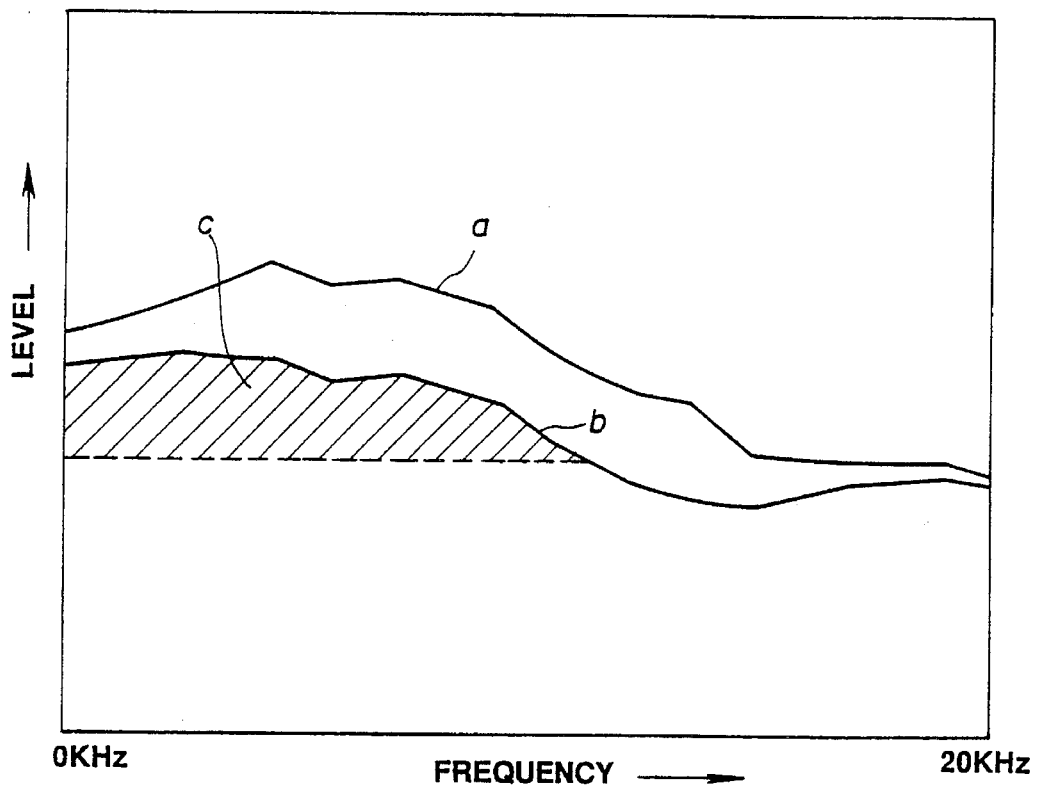
FIG. 6 is a graph showing the quantization noise spectrum for the signal shown in FIG. 5.
Figure 7:
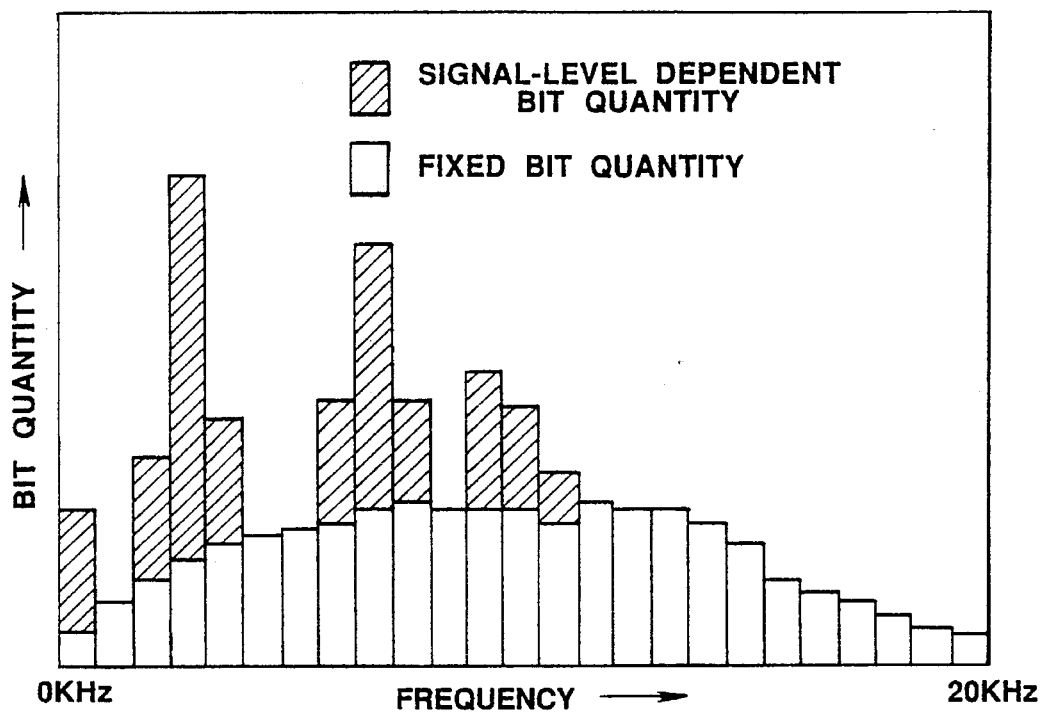
FIG. 7 is a graph showing an example of how the circuit shown in FIG. 1 allocates bits to a high tonality signal.
Figure 8:
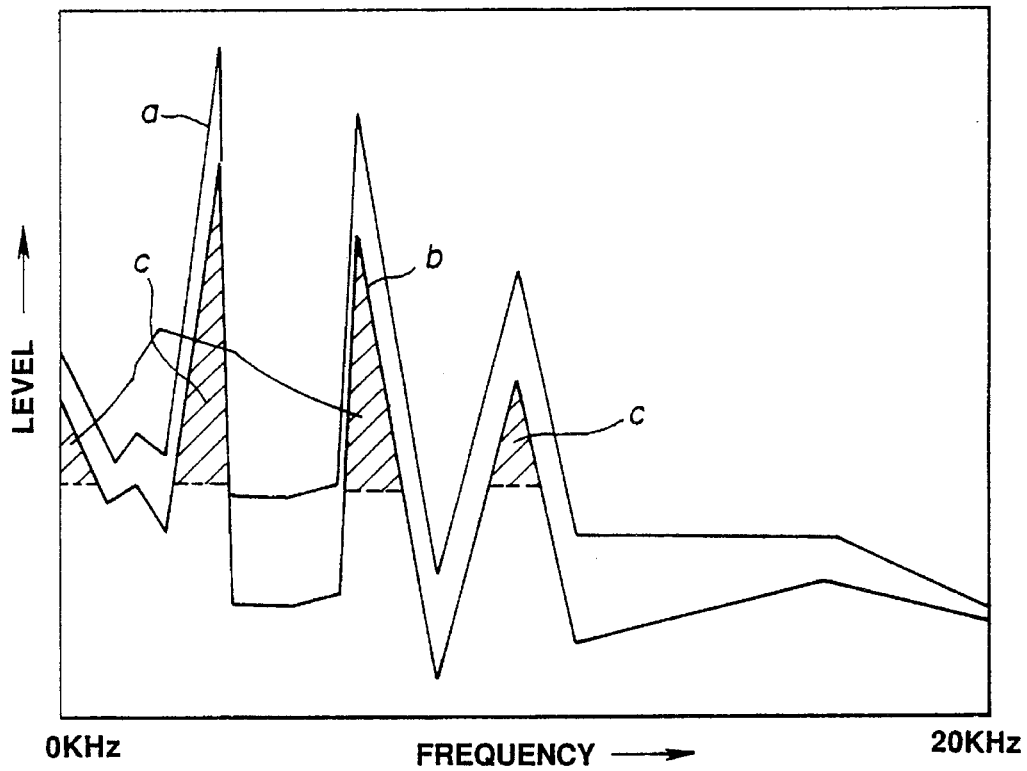
FIG. 8 is a graph showing the quantization noise spectrum for the signal shown in FIG. 7.

FIG. 5 shows how bits are allocated among the critical bands for a signal having a relatively flat spectrum. FIG. 6 shows the corresponding quantization noise spectrum. FIG. 7 shows how bits are allocated among the critical bands when the signal has a high tonality, that is, when the signal is perceived by the listener has having a definite pitch. FIG. 8 shows the corresponding quantization noise spectrum.

In FIGS. 5 and 7, the non-hatched area indicates the quantity of bits that are allocated according to a selected predetermined bit allocation pattern, and the hatched area indicates the quantity of bits that are allocated depending on signal energy in the critical bands. In FIGS. 6 and 8, curves a, b, and c indicate the signal level, the quantization noise level ascribable to the bits allocated according to a selected predetermined bit allocation pattern, and the decreased noise level resulting from the bits allocated depending on signal energy in the critical bands, respectively.

In FIGS. 5 and 6, the signal spectrum is relatively flat and the noise level ascribable to the bits allocated according to a selected predetermined bit allocation pattern provides a certain signal-to-noise ratio across the entire frequency spectrum. The selected bit allocation pattern allocates fewer bits to critical bands at and near the low and high frequency extremes of the frequency spectrum because the ear is less sensitive in these pans of the spectrum.

Bit allocation depending on signal energy in the critical bands selectively reduces the noise level in the part of the frequency spectrum in which the signal has a larger amplitude. However, when the signal spectrum is relatively flat, as in FIGS. 5 and 6, bit allocation depending on the signal energy in the critical bands allocates bits to a relatively large number of critical bands, and lowers the noise level over a broad frequency range.

On the other hand, when the signal is highly tonal, as shown in FIGS. 7 and 8, bit allocation depending on signal energy in the critical bands reduces the quantization noise in a narrow frequency range. This leads to an improved signal-to-noise ratio in the presence of a highly tonal signal, such as a single-frequency (or narrow bandwidth) signal.

Figure 9:
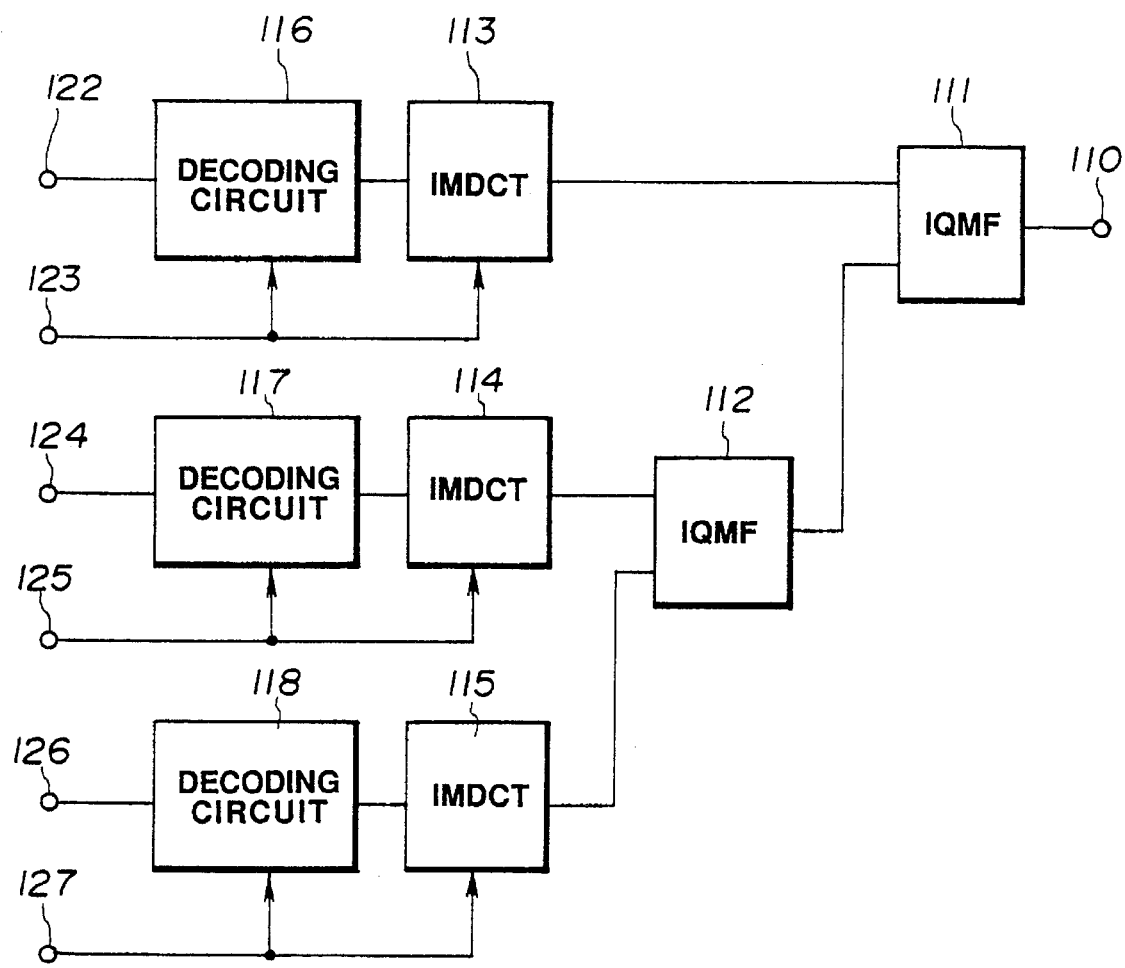
FIG. 9 is a block circuit diagram showing a decoding apparatus which is a counterpart of the encoding apparatus shown in FIG. 1.

FIG. 9 shows a decoding circuit for decoding a compressed digital signal provided by the encoder just described, after the signal has been transmitted or recorded. The compressed digital signal is demultiplexed by a demultiplexer (not shown) to extract the quantization word length information from the compressed digital signal. The spectral coefficients, quantized in the respective critical bands with a number of bits that varies from critical band to critical band, are separated into the respective frequency ranges and are supplied to the input terminals 122, 124 and 126 of the decoding circuit. The quantization word length data is fed into the decoding circuit via the input terminals 123, 125 and 127. In the decoding circuits 116, 117 and 118, the spectral coefficients are extracted in response to the quantization word length data.

In the inverse transform inverse circuits 113, 114 and 115, which are preferably inverse MDCT circuits (IMDCT circuits), the spectral coefficients on the frequency axis are converted into samples on the time axis. The samples on the time axis for the three frequency ranges are recombined by the inverse QMF (IQMF) circuits 112, 111 into a full frequency digital output signal, which is provided at the output terminal 110.

Figure 10:
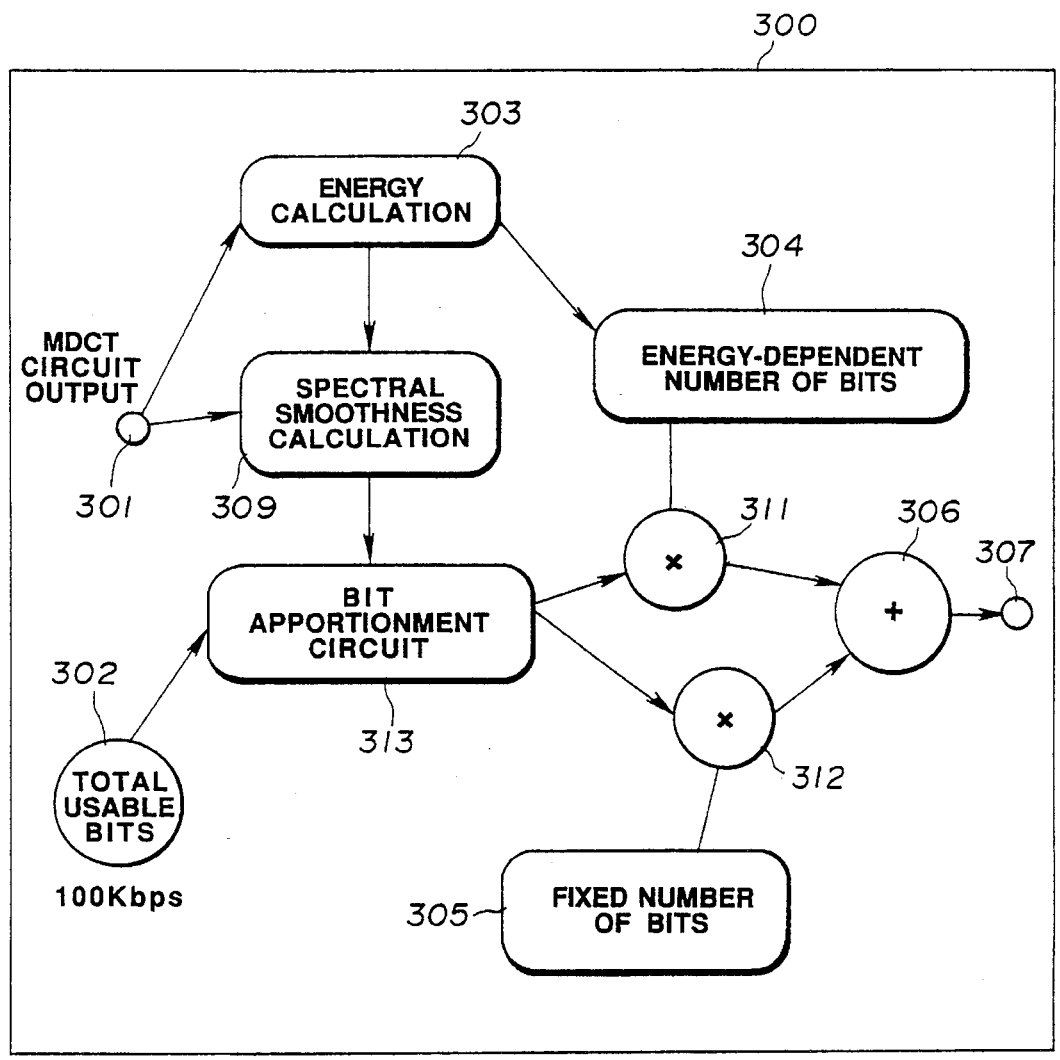
FIG. 10 is a block diagram illustrating a first alternative bit allocation circuit of the adaptive bit allocation and encoding circuit of FIG. 1. The first alternative bit allocation circuit provides a variable apportionment of quantizing bits between fixed bits and variable bits.
Figure 11:
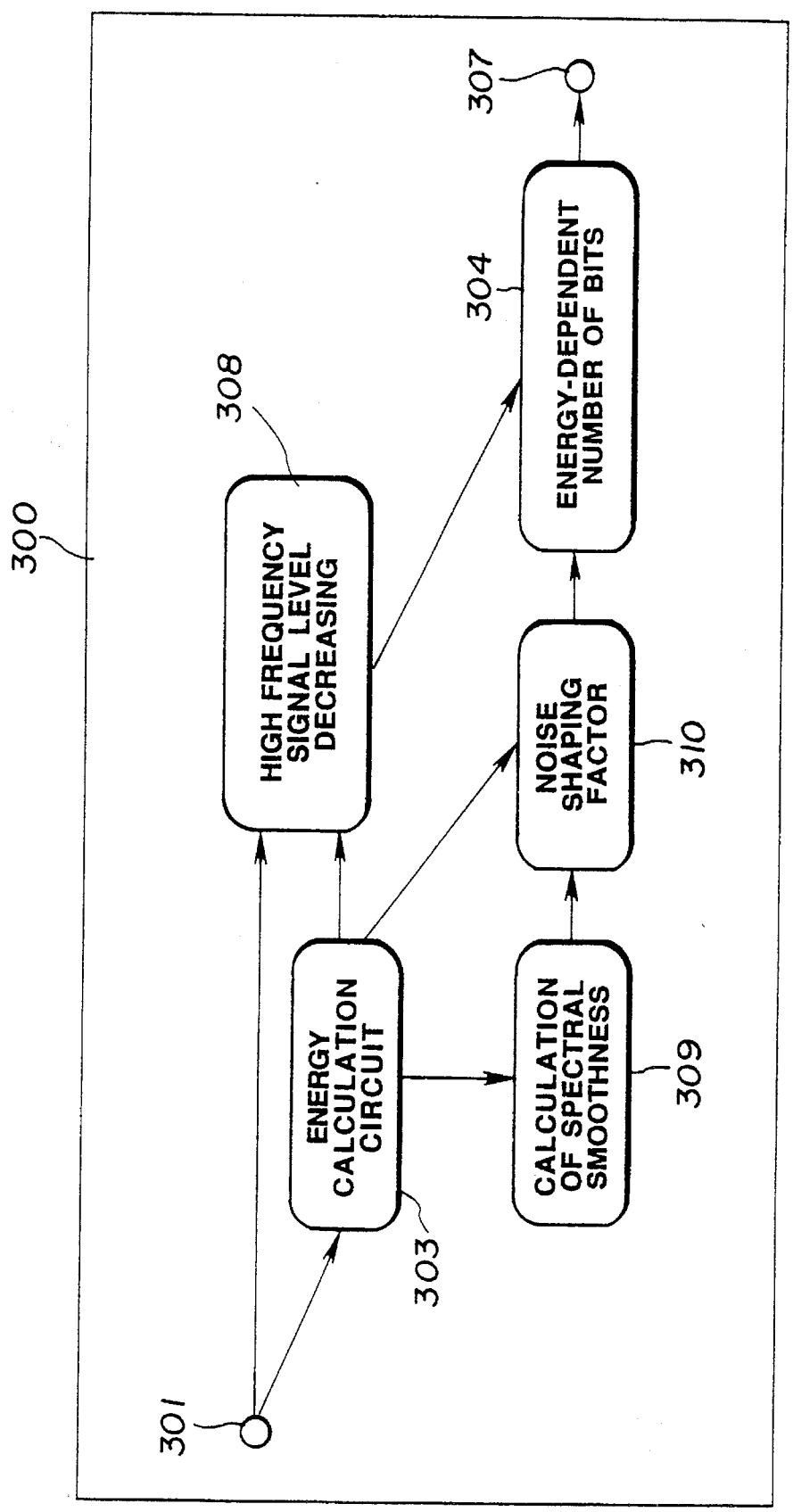
FIG. 11 is a block diagram illustrating a second alternative bit allocation circuit of the adaptive bit allocation and encoding circuit of FIG. 1. The second alternative bit allocation circuit allocates bits according to a variable noise shaping factor.

Two variations on the encoder described above, which use different bit allocation schemes, are shown in FIGS. 10 and 11.

FIG. 10 is a functional block diagram showing a practical example for explaining the function of a first variation on the adaptive bit allocation and encoding circuits 16 to 18 shown in FIG. 1. In the basic embodiment, the ratio between bits that are allocated according to a predetermined bit pattern and the bits that are allocated according to the energy in the critical bands is fixed. In the practical example just described the ratio is 60:40. In the first variation, the total number of bits available for quantization is apportioned between bits that allocated according to a predetermined bit pattern and bits that are allocated according to the energy in the critical bands. The apportionment is varied according to the spectral smoothness of the input signal.

In the following description of the first variation, it will again be assumed that the number of bits available for quantizing the spectral coefficients, and which may be used for transmission or recording, is 100 kb/s. This is indicated in FIG. 10 as the total number of bits from the block 302 indicating the total number of usable bits, or 100 kb/s.

As in the basic embodiment, a plurality of predetermined bit allocation patterns are provided. A plurality of predetermined bit allocation patterns are provided for each possible apportionment of the total 100 kb/s for allocation according to a predetermined bit pattern, e.g., 40 kb/s, 50 kb/s, 60 kb/s and 70 kb/s. One of the predetermined bit allocation patterns is selected at a time, depending on signal properties, and bits are allocated among the critical bands according to the selected predetermined bit allocation pattern. In the first variation, a variety of patterns are provided in which the number of bits apportioned for allocation according to a selected one of a plurality of predetermined bit allocation patterns is distributed to the respective critical bands according to the selected predetermined bit allocation pattern.

The plurality of predetermined bit allocation patterns of the first variation have different bit allocation ratios for the low- to mid-frequency range and for the high-frequency range. A bit allocation pattern allocating fewer bits to the high-frequency range is selected when the amplitude of the input signal is small. This takes advantage of the loudness effect in which the sensitivity of the ear to higher frequencies is reduced at low signal levels.

Although the magnitude of the full-range signal may be used to select the appropriate predetermined bit allocation pattern, it is also possible to use an output of one of the MDCT circuits, or the output of a non-block forming frequency dividing circuit. A non-block forming frequency dividing circuit is a frequency dividing circuit using a filter that divides a digital input signal along the frequency axis without dividing the signal into frames or blocks along the time axis.

In the first variation, the apportionment of the quantization bits between bits allocated according to a predetermined bit allocation pattern and bits allocated among the critical bands according to the signal energy in the critical bands is variable. The apportionment is determined by a spectral smoothness index that indicates the smoothness of the signal spectrum. The spectral smoothness index is calculated in a spectral smoothness calculating circuit by dividing the sum of the absolute values of the differences in energy between adjacent critical bands by the sum of the energies in all the critical bands.

Referring to FIG. 10, the spectral smoothness calculating circuit 309 receives the output of the energy calculating circuit 303 and calculates spectral smoothness index according to the formula:

$$SSI = 0.5 \times \frac{\sum_{i=1}^{n} |S_i - S_{i-1}|}{\sum_{i=1}^{n} |S_i|} \quad (3)$$

where SSI is the spectral smoothness index, and $S_i$ is the spectral energy in the i'th critical band.

The energy calculating circuit is described above in connection with FIG. 3, and so will not be described again here. The calculated spectral smoothness index is fed into the bit apportionment ratio circuit 313, which also receives the output of the total usable bit circuit 302. The bit apportionment ratio circuit apportions the total number of usable bits between bits to be allocated according to signal energy in the critical bands and bits to be allocated according to a predetermined bit allocation pattern in response to the spectral smoothness index according to the following formula:

$$\frac{\text{number of energy-dependent bits}}{\text{number of predetermined allocation pattern bits}} = SSI \quad (4)$$

The output of the bit apportionment circuit 313 is connected to the bit allocating circuits 311 and 312 where it indicates the number of bits available for allocation by the respective bit allocating circuits 311 and 312.

The output of the energy calculating circuit 303 is also fed into the energy-dependent bit allocation circuit 304, which allocates bits among the critical bands according to the signal energies in the critical bands, i.e., according to the Burke spectrum. Bits are allocated among the critical bands according to the formula:

$b(k) = \delta + \frac{1}{2}\log_2\{\sigma^2(k)/D\}$  (5)

where b(k) is the word length of the quantized spectral coefficients in the k'th critical band, δ is an optimum bias, $\sigma^2(k)$ is the signal energy in the k'th critical band, and D is the mean quantization noise power over all the entire frequency spectrum. To find the optimum value of b(k) for each critical band, the value of δ is changed so that the sum of the b(k)s for all the critical bands is equal to, or just less than, the total number of bits available for quantization. The output of the energy-dependent bit allocating circuit is connected to the variable bit allocating circuit 311.

The output of the fixed bit allocating circuit 305, which allocates bits according to a selected one of a number of predetermined bit allocation patterns, is connected to the fixed bit allocating circuit 312.

The outputs of the bit allocating circuits 311 and 312 are supplied to the bit sum calculating circuit 306. The bit sum calculating circuit 306 calculates the total number of bits that can be used for quantizing each critical band. This sum comprises the number of bits allocated to the critical band according to the selected one of the predetermined bit allocation patterns, and the number of bits allocated to the critical band according to signal energy in the band, or a subdivision of the critical band at higher frequencies. The bit sum calculated by the bit sum calculating circuit is provided at the output terminal 307 for use for quantization.

Typical bit allocations for signals having differing spectral content are in FIGS. 5 and 7, and the corresponding quantization noise spectra are shown in FIGS. 6 and 8, respectively. FIG. 5 shows how bits are allocated among the critical bands for a signal having a relatively flat spectrum. FIG. 6 shows the corresponding quantization noise spectrum. FIG. 7 shows how bits are allocated among the critical bands when the signal has a high totality, that is, when the signal is perceived by the listener as having a definite pitch. FIG. 8 shows the corresponding quantization noise spectrum.

In FIGS. 5 and 7, the non-hatched area indicates the quantity of bits that are allocated according to a selected predetermined bit allocation pattern. The hatched area shows the quantity of bits that are allocated depending on signal energy in the critical bands. In FIGS. 6 and 8, curves a, b, and c indicate the signal level, the noise level ascribable to the bits allocated according to a selected predetermined bit allocation pattern, and the decreased noise resulting from the bits dependent on signal energy in the critical bands, respectively.

In FIGS. 5 and 6, the signal spectrum is relatively flat and the noise level ascribable to the bits allocated according to a preselected bit allocation pattern provides a certain signal-to-noise ratio across the entire frequency spectrum. However, fewer bits are allocated to critical bands at and near the low- and high-frequency extremes of the spectrum because the ear is less sensitive in these parts of the spectrum.

Bit allocation depending on signal energy in the critical bands reduces the noise level in the pan of the frequency spectrum in which the signal has a larger amplitude. However, when the signal spectrum is flat, bit allocation according to signal energy in the critical bands occurs in a larger number of critical bands, and lowers the noise level over a broader frequency range.

Conversely, if the signal exhibits high tonality, as shown in FIGS. 7 and 8, the lowering of the quantization noise resulting from the bit allocation according to energy in the critical bands reduces the noise in an extremely narrow frequency range. This leads to an improved signal-to-noise ratio in the presence of single-frequency (or narrow bandwidth) input signals.

If the signal spectrum exhibits high tonality, as shown in FIGS. 7 and 8, the lowering of the quantization noise ascribable to the bit allocation dependent on the signal energy in the critical bands is utilized for reducing the noise in an extremely narrow range. This leads to improved an improved signal-to-noise ratio in the presence of high-tonality input signals. The noise level over a wide frequency range also is uniformly lowered by the smaller number of bits allocated according to a predetermined bit allocation pattern.

The results shown in FIGS. 5 through 8 are the same as those obtained for the basic embodiment. Differences between the basic embodiment and the first variation appear when the signal spectrum becomes flatter than that shown in FIG. 5. With such a signal, the number of bits allocated according to the energy in the critical bands is decreased below the 40 kb/s set in the basic embodiment, and the number of bits allocated according to a preselected bit allocation pattern is increased beyond the 60 kb/s set in the basic embodiment. Differences between the basic embodiment and the first variation also appear when the signal spectrum becomes more tonal than the signal shown in FIG. 7. With such a signal, the number of bits allocated according to the energy in the critical bands is increased beyond the 40 kb/s set in the basic embodiment, and the number of bits allocated according to a preselected bit allocation pattern is reduced below the 60 kb/s set in the basic embodiment.

A second variation on the adaptive bit allocation part of the circuit is shown in FIG. 11. FIG. 11 is a functional block diagram showing a practical example for explaining the function of the second variation on the adaptive bit allocation and encoding circuits 16 to 18 shown in FIG. 1.

Spectral coefficients from the MDCT circuits 13 to 15 in FIG. 1 are supplied to the input terminal 301 of the adaptive bit allocation circuit 300, and thence to the energy calculating circuit 303. The energy calculating circuit is the same as the energy calculating circuit in FIG. 3, and will not be described again here. The energy calculating circuit calculates signal energies in each critical band, or in sub bands obtained by subdividing the higher frequency critical bands.

The spectral coefficients from the MDCT circuits 13 through 15 (FIG. 1) are also supplied via the input terminal 301 to the circuit for diminishing high range signal levels 308. The band energies calculated by the energy calculating circuit 303 are supplied to the circuit for diminishing high frequency signal levels 308, the spectral smoothness calculating circuit 309, and to the noise shaping factor circuit 310.

The circuit for diminishing the high frequency signal levels 308 decreases the high frequency signal level to a larger extent when the signal energies in the critical bands at 4 kHz and above are low. This takes into account the diminished sensitivity of the human hearing mechanism at higher frequencies.

The spectral smoothness calculating circuit 309 is the same as the spectral smoothness calculating circuit 309 described above in connection with FIG. 10, and so will not be described again here.

In response to the output of the spectral smoothness calculating circuit 309, the noise shaping factor circuit 310 decreases the noise shaping factor when the spectral smoothness index is small, i.e., when the spectrum is smooth. The spectral smoothness index is calculated by dividing of the sum of the differences in signal energy between adjacent critical bands over the entire frequency range, by the sum, over the entire frequency range, of the signal energies in all the critical bands.

The energy-dependent bit allocation circuit 304 receives the calculated noise shaping factor from the noise shaping factor circuit 310 and the signal spectrum with decreased high frequency signal level from the high frequency signal level decreasing circuit 308 and carries out bit allocation in accordance with the formula (1). The energy-dependent bit allocation circuit 304 is energy dependent because of the band energy term in the formula (1). The bit allocation values generated by the circuit 304 are provided via the output terminal 307 and are used for quantization.

Figure 12:
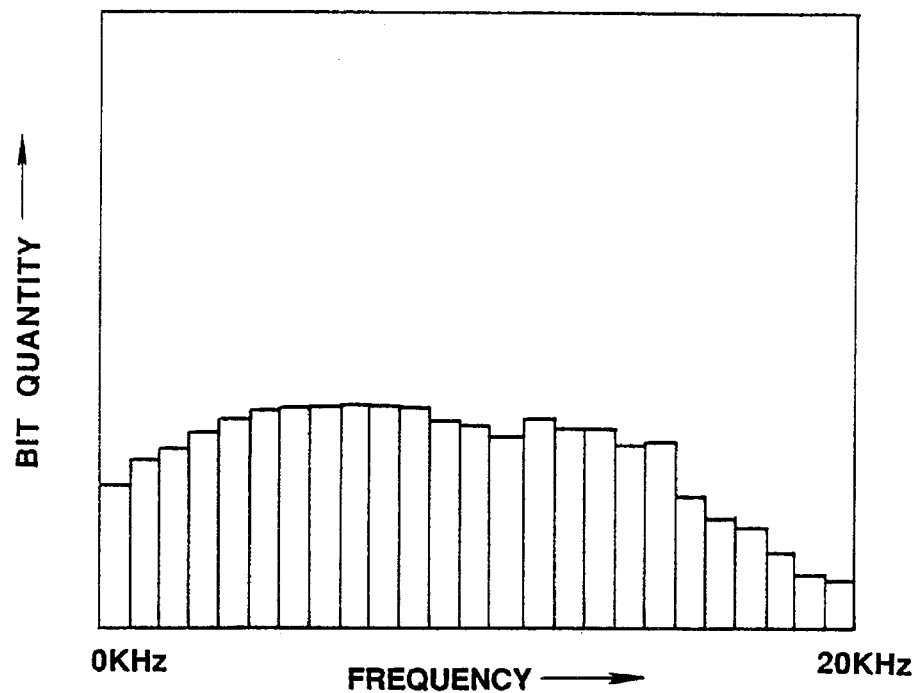
FIG. 12 is a graph showing an example of how the circuit shown in FIG. 1 using the second alternative bit allocation circuit allocates bits to a signal having a relatively flat spectrum.
Figure 13:
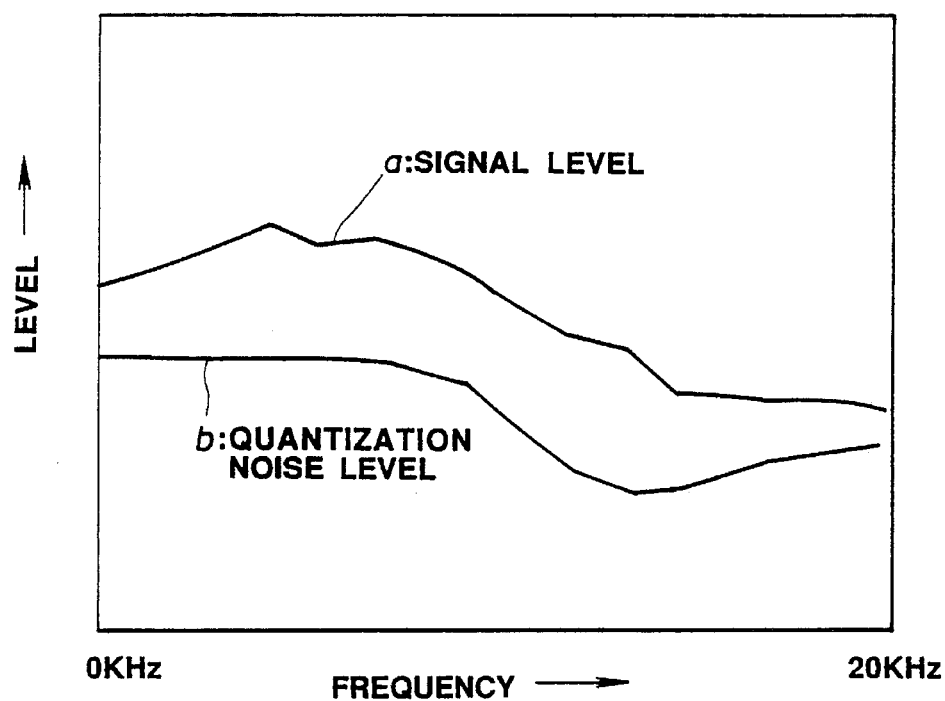
FIG. 13 is a graph showing the quantization noise spectrum for the signal shown in FIG. 12.
Figure 14:
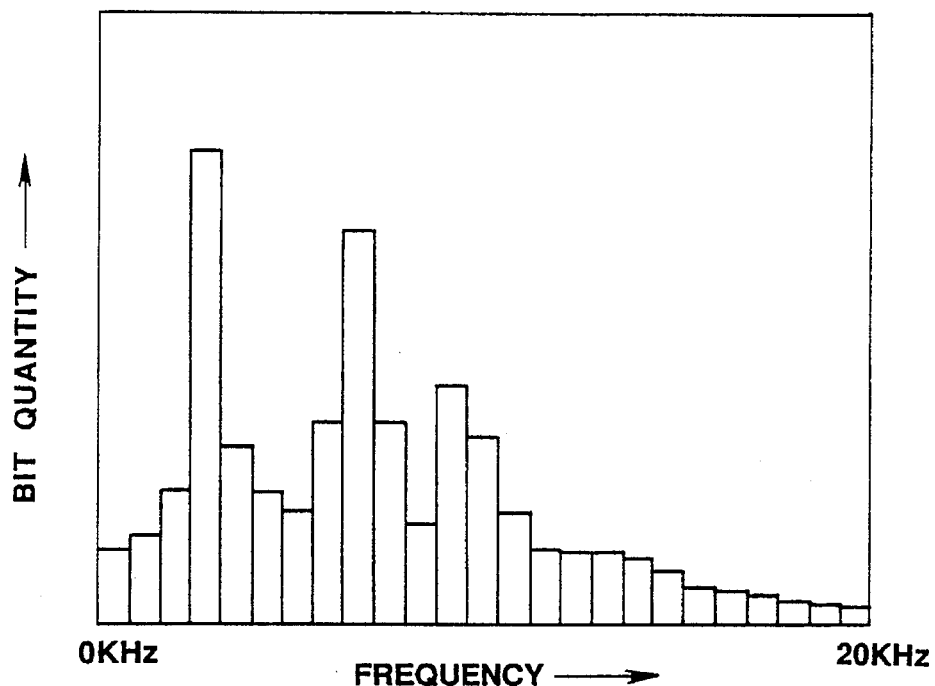
FIG. 14 is a graph showing an example of how the circuit shown in FIG. 1 using the second alternative bit allocation circuit allocates bits to a high tonality signal.
Figure 15:
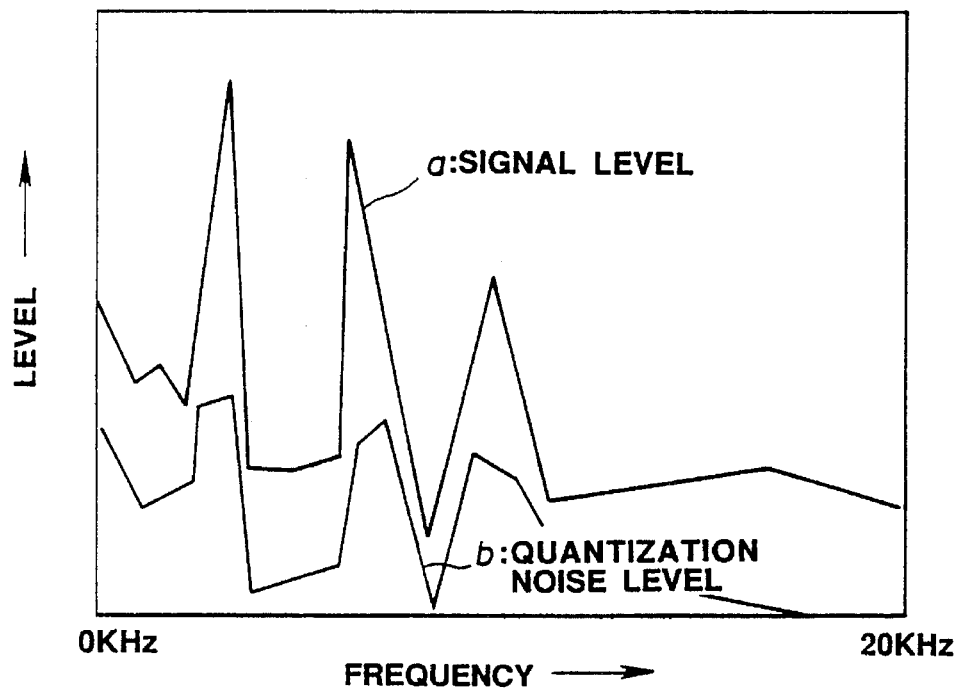
FIG. 15 is a graph showing the quantization noise spectrum for the signal shown in FIG. 14.

FIGS. 12 and 14 show typical bit allocations for signals having differing spectral content. FIGS. 13 and 15 show the corresponding quantization noise spectra. FIG. 12 shows how the bits are allocated among the critical bands for a signal with a relatively flat spectrum. FIG. 13 shows the corresponding quantization noise spectrum. FIG. 14 shows how the bits are allocated among the critical bands for a signal with high tonality, i.e., a signal that is perceived by a listener as having a definite pitch. FIG. 15 shows the corresponding quantization noise spectrum.

In FIGS. 13 and 15, curves a and b indicate the signal level and the quantization noise level, respectively.

In FIGS. 12 and 13, the signal spectrum is relatively flat. The spectral smoothness index is small, and the noise shaping factor consequently approaches minus 1. On the other hand, when the signal is relatively tonal, as shown in FIGS. 14 and 15, the spectral smoothness index is large, which reduces the noise shaping factor to close to zero. This changes the quantization noise spectrum to close to white. This leads to an improved signal-to-noise ratio in the presence of tonal signals, such as single frequency (or narrow bandwidth) signals.

I claim:

1. A digital encoding apparatus for compressing a digital input signal to provide a compressed digital output signal, the digital input signal representing an audio information signal, the compressed digital output signal, after expansion, conversion to an analog signal and reproduction of the analog signal, being for perception by the human ear, the apparatus comprising:

first frequency dividing means for receiving the digital input signal and for dividing the digital input signal into a plurality of frequency ranges;

time dividing means for dividing in time at least one of the frequency ranges of the digital input signal into a plurality of blocks;

second frequency dividing means for orthogonally transforming each block to provide a plurality of spectral coefficients;

means for grouping the plurality of spectral coefficients into critical bands;

noise factor setting means for setting a noise shaping factor in response to an amplitude of the digital input signal; and bit allocating means for allocating among the critical bands a total number of quantizing bits available for quantizing the spectral coefficients, the quantizing bits being allocated among the critical bands according to the noise-shaping factor.

2. The digital encoding apparatus of claim 1, wherein the compressed output signal, after expansion, conversion to an analog signal and reproduction of the analog signal, has quantizing noise, the quantizing noise having a spectrum, the quantizing noise being dependent on the allocation of the quantizing bits among the critical bands, and the noise factor setting means sets the noise shaping factor such that, as the amplitude of the digital input signal increases, the spectrum of the quantizing noise is flattened.

3. The digital encoding apparatus of claim 1, wherein the digital input signal has a spectrum having a smoothness, and the noise factor setting means sets the noise shaping factor in response to the smoothness of the spectrum of the digital input signal.

4. The digital encoding apparatus of claim 3, wherein the compressed output signal, after expansion, conversion to an analog signal and reproduction of the analog signal, has quantizing noise, the quantizing noise having a spectrum, the quantizing noise being dependent on the allocation of the quantizing bits among the critical bands, and the noise factor setting means sets the noise shaping factor such that, as the smoothness of the spectrum of the digital input signal increases, the spectrum of the quantizing noise is flattened.

5. The digital encoding apparatus of claim 4, wherein the apparatus additionally includes a spectral smoothness index generating means for generating a spectral smoothness index in response to the smoothness of the spectrum of the digital input signal, and the spectral smoothness index generating means derives the spectral smoothness index in response to a measured difference in energy between adjacent critical bands.

6. The digital encoding apparatus of claim 4, wherein the apparatus additionally includes a spectral smoothness index generating means for generating a spectral smoothness index in response to the smoothness of the spectrum of the digital input signal, the apparatus additionally comprises a floating point processing means for floating point processing the spectral components and for generating floating point data for each critical band, and the spectral smoothness index generating means derives the spectral smoothness index in response to a difference in floating point data between adjacent critical bands.

7. The apparatus of claim 3, wherein the digital input signal additionally has an amplitude, and the bit allocation means changes the allocation of quantization bits in response to a signal having diminished spectral levels at high frequencies when the amplitude of the digital input signal is small.

8. The apparatus of claim 7, wherein the digital input signal has a minimum audibility frequency, and the high frequency spectral levels are diminished for digital input signal amplitudes that are small at frequencies not lower than the minimum audibility frequency.

9. An apparatus for decoding a compressed digital input signal to provide a digital output signal, the compressed digital input signal being derived from a non-compressed digital input signal, the non-compressed digital input signal representing an audio information signal, the compressed digital input signal, after decoding, conversion to an analog signal, and reproduction of the analog signal, being for perception by the human ear, the compressed digital input signal being derived from the non-compressed digital input signal by the steps of:

dividing the non-compressed digital input signal into a plurality of frequency ranges;

dividing in time each of the frequency ranges of the non-compressed digital input signal into a plurality of blocks;

orthogonally transforming each block to provide a plurality of spectral coefficients;

grouping the plurality of spectral coefficients into critical bands;

setting a noise shaping factor in response to an amplitude of the non-compressed digital input signal;

allocating among the critical bands a total number of quantizing bits available for quantizing the spectral coefficients, the quantizing bits being allocated among the critical bands according to the noise-shaping factor;

generating quantizing word length data indicating the number of bits used to quantize the spectral coefficients in each critical band; and multiplexing the quantized spectral coefficients and the word length data to provide the compressed digital input signal;

the decoder comprising:

demultiplexing means for extracting the quantizing word-length data from the compressed digital input signal and for extracting the spectral coefficients from the compressed digital input signal using the quantizing word-length data, means for grouping the extracted spectral coefficients into a plurality of frequency ranges;

means for performing an inverse orthogonal transform on the spectral coefficients in each frequency range to generate blocks of time-dependent data in each frequency range; and means for combining the blocks of time-dependent data in each frequency range to provide the digital output signal.

10. A medium for recording compressed digital data derived from a non-compressed digital input signal by a process including the steps of:

dividing the non-compressed digital input signal into a plurality of frequency ranges;

dividing in time each of the frequency ranges of the non-compressed digital input signal into a plurality of blocks;

orthogonally transforming each block to provide a plurality of spectral coefficients;

grouping the plurality of spectral coefficients into critical bands;

setting a noise shaping factor in response to an amplitude of the non-compressed digital input signal;

allocating among the critical bands a total number of quantizing bits available for quantizing the spectral coefficients, the quantizing bits being allocated among the critical bands according to the noise-shaping factor; and multiplexing the quantized spectral coefficients and quantizing word length data to provide the compressed digital data.

11. The medium of claim 10, wherein, in the process:

the non-compressed digital input signal has a spectrum having a smoothness, and the step of setting a noise factor includes setting the noise shaping factor in response to the smoothness of the spectrum of the non-compressed digital input signal.

12. A method for deriving compressed digital data from a non-compressed digital input signal, the method including the steps of:

dividing the non-compressed digital input signal into a plurality of frequency ranges;

dividing in time each of the frequency ranges of the non-compressed digital input signal into a plurality of blocks;

orthogonally transforming each block to provide a plurality of spectral coefficients;

grouping the plurality of spectral coefficients into critical bands;

setting a noise shaping factor in response to an amplitude of the non-compressed digital input signal;

allocating among the critical bands a total number of quantizing bits available for quantizing the spectral coefficients, the quantizing bits being allocated among the critical bands according to the noise-shaping factor; and multiplexing the quantized spectral coefficients and quantizing word length data to provide the compressed digital data.

13. The method of claim 12, wherein:

the non-compressed digital input signal has a spectrum having a smoothness, and the step of setting a noise factor includes setting the noise shaping factor in response to the smoothness of the spectrum of the non-compressed digital input signal.

\* \* \* \* \*